(12) United States Patent
Ben-Shmuel et al.

(10) Patent No.: US 11,129,245 B2
(45) Date of Patent: Sep. 21, 2021

(54) DYNAMIC IMPEDANCE MATCHING IN RF RESONATOR CAVITY

(71) Applicant: GOJI LIMITED, Hamilton (BM)

(72) Inventors: Eran Ben-Shmuel, Savyon (IL); Alexander Bilchinsky, Monosson-Yahud (IL)

(73) Assignee: GOJI LIMITED, Hamilton (BM)

(*) Notice: Subject to any disclaimer, the term of this patent is extended or adjusted under 35 U.S.C. 154(b) by 1304 days.

(21) Appl. No.: 14/746,974

(22) Filed: Jun. 23, 2015

(65) Prior Publication Data

US 2015/0312971 A1 Oct. 29, 2015

Related U.S. Application Data

(63) Continuation of application No. 12/230,431, filed on Aug. 28, 2008, now Pat. No. 9,131,543.

(60) Provisional application No. 60/935,787, filed on Aug. 30, 2007, provisional application No. 60/935,788, filed on Aug. 30, 2007.

(51) Int. Cl.
| | | |
|---|---|---|
| *H05B 6/64* | (2006.01) | |
| *H05B 6/72* | (2006.01) | |
| *H05B 6/70* | (2006.01) | |
| *A23L 5/10* | (2016.01) | |

(52) U.S. Cl.
CPC ............ *H05B 6/6447* (2013.01); *A23L 5/15* (2016.08); *H05B 6/6402* (2013.01); *H05B 6/705* (2013.01); *H05B 6/72* (2013.01); *A23V 2002/00* (2013.01); *Y02B 40/00* (2013.01)

(58) Field of Classification Search
CPC .......... A61M 5/445; H05B 6/68; H05B 6/70; H05B 6/72; H05B 6/78

USPC ................. 219/687, 703, 710, 748
See application file for complete search history.

(56) References Cited

U.S. PATENT DOCUMENTS

| | | | |
|---|---|---|---|
| 2,489,337 A | 11/1949 | Sperling | |
| 2,543,130 A | 2/1951 | Robertson | |
| 2,593,067 A | 4/1952 | Spencer | |
| 2,895,828 A | 7/1959 | Kamide | |
| 2,917,739 A | 12/1959 | Halpern | |

(Continued)

FOREIGN PATENT DOCUMENTS

| | | |
|---|---|---|
| CN | 1968609 | 5/2007 |
| DE | 10200702562 | 10/2007 |

(Continued)

OTHER PUBLICATIONS

Machine Translation of EP-0615763, Jul. 2018.*

(Continued)

*Primary Examiner* — Tu B Hoang
*Assistant Examiner* — Thomas J Ward
(74) *Attorney, Agent, or Firm* — Greenblum & Bernstein, P.L.C.

(57) ABSTRACT

A method for matching an impedance of a system comprising a cavity and one or more feeds to an impedance of one or more sources of electromagnetic radiation irradiating a plurality of frequencies into the cavity via the feeds, comprising: determining a plurality of s-parameter of the system for a frequency band; determining the system impedance based on the s-parameters; and modifying the system impedance according to the difference between the impedance of the system and the impedance of the source.

13 Claims, 5 Drawing Sheets

(56) References Cited

U.S. PATENT DOCUMENTS

| | | |
|---|---|---|
| 3,019,399 A | 1/1962 | Lanciani et al. |
| 3,151,325 A | 9/1964 | Kompfner |
| 3,231,892 A | 1/1966 | Matson et al. |
| 3,633,538 A | 1/1972 | Hoeflin |
| 3,806,689 A | 4/1974 | Kegereis et al. |
| 3,936,627 A | 2/1976 | Fitzmayer |
| 4,035,599 A | 7/1977 | Kashyap et al. |
| 4,165,454 A | 8/1979 | Carlsson et al. |
| 4,196,332 A | 4/1980 | MacKay et al. |
| 4,210,795 A | 7/1980 | Lentz |
| 4,250,628 A | 2/1981 | Smith et al. |
| 4,279,722 A | 7/1981 | Kirkbridge |
| 4,336,435 A | 6/1982 | Kashyap et al. |
| 4,342,035 A | 7/1982 | Anderson et al. |
| 4,342,896 A | 8/1982 | Teich |
| 4,354,153 A | 10/1982 | Lentz |
| 4,377,733 A | 3/1983 | Yamaguchi et al. |
| 4,431,888 A | 2/1984 | Simpson |
| 4,447,693 A | 5/1984 | Buck |
| 4,464,554 A | 8/1984 | Bakanowski et al. |
| 4,475,024 A | 10/1984 | Tateda |
| 4,507,530 A | 3/1985 | Smith |
| 4,517,429 A | 5/1985 | Horinouchi |
| 4,568,810 A | 2/1986 | Carmean |
| 4,596,915 A | 6/1986 | Simpson |
| 4,855,555 A | 8/1989 | Adams et al. |
| 4,897,151 A | 1/1990 | Killackey et al. |
| 4,982,164 A * | 1/1991 | Schiek .................. G01R 27/28 324/601 |
| 5,036,172 A | 7/1991 | Kokkeler et al. |
| 5,191,182 A | 3/1993 | Gelorme et al. |
| 5,202,095 A | 4/1993 | Houchin et al. |
| 5,321,222 A | 6/1994 | Bible et al. |
| 5,451,751 A | 9/1995 | Takimoto et al. |
| 5,468,940 A | 11/1995 | Kang |
| 5,512,736 A | 4/1996 | Kang et al. |
| 5,521,360 A | 5/1996 | Johnson et al. |
| 5,558,800 A | 9/1996 | Page |
| 5,616,268 A * | 4/1997 | Carr ..................... A61M 5/445 219/687 |
| 5,632,921 A | 5/1997 | Risman et al. |
| 5,698,128 A | 12/1997 | Sakai et al. |
| 5,721,286 A | 2/1998 | Lauf et al. |
| 5,798,395 A | 8/1998 | Lauf et al. |
| 5,804,801 A | 9/1998 | Lauf et al. |
| 5,812,393 A | 9/1998 | Drucker |
| 5,818,649 A | 10/1998 | Anderson |
| 5,828,040 A | 10/1998 | Risman |
| 5,828,042 A | 10/1998 | Choi et al. |
| 5,834,744 A | 11/1998 | Risman |
| 5,873,254 A | 2/1999 | Arav |
| 5,877,479 A | 3/1999 | Yu |
| 5,883,801 A | 3/1999 | Drucker et al. |
| 5,927,265 A | 7/1999 | McKee et al. |
| 5,961,871 A | 10/1999 | Bible et al. |
| 5,977,532 A | 11/1999 | Ekemar |
| 5,981,928 A | 11/1999 | Lee |
| 5,998,775 A | 12/1999 | Sung |
| 6,060,701 A | 5/2000 | McKee et al. |
| 6,096,361 A | 8/2000 | Yamane et al. |
| 6,104,018 A | 8/2000 | Varma et al. |
| 6,114,677 A | 9/2000 | Idomoto et al. |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,225,940 B1 | 5/2001 | Ohlsen |
| 6,249,710 B1 | 6/2001 | Drucker et al. |
| 6,252,206 B1 | 6/2001 | Leukhardt, III et al. |
| 6,262,406 B1 | 7/2001 | McKee et al. |
| 6,274,859 B1 | 8/2001 | Yoshino et al. |
| 6,320,165 B1 | 11/2001 | Ovadia |
| 6,320,171 B1 | 11/2001 | Kim |
| 6,384,392 B1 | 5/2002 | Lee et al. |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Søgaard |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,614,011 B2 | 9/2003 | Omori et al. |
| 6,657,173 B2 | 12/2003 | Flugstad et al. |
| 6,674,056 B2 | 1/2004 | Lee |
| 6,680,467 B1 | 1/2004 | Whipple, Jr. |
| 6,686,567 B1 | 2/2004 | Hwang |
| 6,720,541 B2 | 4/2004 | Watanabe |
| 6,770,859 B2 | 8/2004 | Kang |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Törngren et al. |
| 6,914,226 B2 | 7/2005 | Ottaway |
| 6,982,401 B2 | 1/2006 | Hu et al. |
| 7,030,347 B2 | 4/2006 | Lee et al. |
| 7,053,346 B2 | 5/2006 | Cheng et al. |
| 7,055,518 B2 | 6/2006 | McFadden et al. |
| 7,080,593 B1 | 7/2006 | Frankel |
| 7,087,872 B1 | 8/2006 | Dobie et al. |
| 7,091,460 B2 | 8/2006 | Kinzer |
| 7,105,787 B2 * | 9/2006 | Clemen, Jr. ............. H05B 6/72 219/702 |
| 7,105,789 B2 | 9/2006 | Ekemar |
| 7,109,457 B2 | 9/2006 | Kinzer |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,207,486 B1 | 4/2007 | Bennett |
| 7,208,710 B2 | 4/2007 | Gregoire et al. |
| 7,235,763 B2 | 6/2007 | Chirstiaansen et al. |
| 7,258,881 B2 | 8/2007 | Jones et al. |
| 7,360,533 B2 | 4/2008 | McFadden |
| 7,361,866 B2 | 4/2008 | Chun |
| 7,388,180 B2 | 6/2008 | Kim et al. |
| 7,409,311 B2 | 8/2008 | Imgram et al. |
| 7,473,869 B2 | 1/2009 | Chun |
| 7,490,538 B2 | 2/2009 | Lowell et al. |
| 7,612,315 B2 | 11/2009 | Corradini |
| 7,626,468 B2 | 12/2009 | Staines |
| 7,629,921 B1 | 12/2009 | Manry et al. |
| 8,147,888 B2 | 4/2012 | Kling et al. |
| 2002/0018183 A1 | 2/2002 | Ito et al. |
| 2002/0162836 A1 | 11/2002 | Taino et al. |
| 2002/0175163 A1 | 11/2002 | Fagrell |
| 2003/0047559 A1 | 3/2003 | Watanabe et al. |
| 2003/0063414 A1 | 4/2003 | Ito |
| 2003/0183972 A1 | 10/2003 | Weber et al. |
| 2004/0074401 A1 | 4/2004 | McMaster et al. |
| 2004/0134904 A1 | 7/2004 | Clemen |
| 2004/0211765 A1 | 10/2004 | McFadden |
| 2004/0216732 A1 | 11/2004 | McFadden |
| 2004/0232140 A1 | 11/2004 | Kanzaki et al. |
| 2005/0030373 A1 | 4/2005 | Wang |
| 2005/0092314 A1 | 5/2005 | Rabas et al. |
| 2005/0092844 A1 | 5/2005 | Zhang et al. |
| 2005/0139686 A1 | 6/2005 | Helmer et al. |
| 2005/0178841 A1 | 8/2005 | Jones et al. |
| 2006/0006173 A1 | 1/2006 | Kim et al. |
| 2006/0049725 A1 | 3/2006 | Simon |
| 2006/0186115 A1 | 8/2006 | Joines et al. |
| 2006/0202032 A1 | 9/2006 | Kricorissian |
| 2006/0259547 A1 | 11/2006 | Bogatin et al. |
| 2006/0289526 A1 | 12/2006 | Takizaki et al. |
| 2007/0007279 A1 | 1/2007 | Chun et al. |
| 2007/0007348 A1 | 1/2007 | Shah |
| 2007/0012690 A1 | 1/2007 | Sim et al. |
| 2007/0137633 A1 | 6/2007 | McFadden |
| 2007/0215603 A1 | 9/2007 | Yoshino et al. |

(56) References Cited

U.S. PATENT DOCUMENTS

| | | |
|---|---|---|
| 2007/0215612 A1 | 9/2007 | Hicks et al. |
| 2007/0251941 A1 | 11/2007 | Givens |
| 2007/0272684 A1 | 11/2007 | Lee |
| 2007/0278218 A1 | 12/2007 | Claesson et al. |
| 2008/0047948 A1 | 2/2008 | Rosenbloom et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | Mcfadden et al. |
| 2008/0160967 A1 | 7/2008 | Narasimhan et al. |
| 2008/0193614 A1 | 8/2008 | Greiner et al. |
| 2008/0206420 A1 | 8/2008 | McFadden |
| 2008/0264269 A1 | 10/2008 | Sterzel et al. |
| 2008/0280000 A1 | 11/2008 | Breunig et al. |
| 2008/0290087 A1 | 11/2008 | Ben Shmuel et al. |
| 2008/0296284 A1 | 12/2008 | McFadden et al. |
| 2009/0014315 A1 | 1/2009 | Chen |
| 2009/0045191 A1 | 2/2009 | Ben Shmuel et al. |
| 2009/0057302 A1 | 3/2009 | Ben-Shmuel et al. |
| 2009/0071110 A1 | 3/2009 | Gonze et al. |
| 2009/0236333 A1 | 9/2009 | Ben Shmuel et al. |
| 2009/0236334 A1 | 9/2009 | Ben Shmuel et al. |
| 2009/0236335 A1 | 9/2009 | Ben-Shmuel et al. |
| 2009/0256706 A1 | 10/2009 | Brown |
| 2009/0274802 A1 | 11/2009 | Kling et al. |
| 2010/0123001 A1 | 5/2010 | Park |
| 2010/0155392 A1 | 6/2010 | Nordh et al. |
| 2010/0176121 A1 | 7/2010 | Nobue et al. |
| 2010/0237067 A1 | 9/2010 | Nordh et al. |
| 2010/0252551 A1 | 10/2010 | Nordh et al. |
| 2012/0125921 A1* | 5/2012 | Shim .................. H05B 6/686 219/702 |

FOREIGN PATENT DOCUMENTS

| | | |
|---|---|---|
| DE | 102007025245 | 10/2007 |
| DE | 102007025263 | 10/2007 |
| DE | 102007025264 | 10/2007 |
| DE | 102007035357 | 2/2009 |
| DE | 102007035359 | 2/2009 |
| EP | 0429822 | 6/1991 |
| EP | 0615763 | 9/1994 |
| EP | 0615763 A2 | 9/1994 |
| EP | 0752195 | 1/1997 |
| EP | 0934681 | 8/1999 |
| EP | 1447632 | 8/2004 |
| EP | 1515102 | 3/2005 |
| EP | 1708118 | 10/2006 |
| EP | 1987288 | 11/2008 |
| EP | 2053315 | 4/2009 |
| EP | 2098788 | 9/2009 |
| ES | 0615763 * | 9/1994 |
| GB | 2033587 | 5/1980 |
| GB | 2391154 | 1/2004 |
| JP | 52-14946 | 2/1977 |
| JP | 63-255783 A | 10/1988 |
| JP | 04-299282 | 10/1992 |
| JP | 06-193884 | 7/1994 |
| JP | 6-215871 | 8/1994 |
| JP | 6-251866 | 9/1994 |
| JP | 06-310268 | 11/1994 |
| JP | 08-064359 | 3/1996 |
| JP | 09-229372 | 9/1997 |
| JP | 2001-086967 | 4/2001 |
| JP | 2002-37420 A | 2/2002 |
| JP | 2002-243161 | 8/2002 |
| JP | 2004-171852 | 6/2004 |
| JP | 2005-228604 | 8/2005 |
| WO | 0268379 | 5/1988 |
| WO | 91/07069 | 5/1991 |
| WO | 95/27387 | 10/1995 |
| WO | 95/27388 | 10/1995 |
| WO | 97/36728 | 10/1997 |
| WO | 99/13688 | 3/1999 |
| WO | 02/23953 | 3/2002 |
| WO | 03/056919 | 7/2002 |
| WO | 2004/010740 | 1/2004 |
| WO | 2004/059563 | 7/2004 |
| WO | 2005/027644 | 3/2005 |
| WO | 2005/041672 | 5/2005 |
| WO | 2005/106333 | 11/2005 |
| WO | 2006/016372 | 2/2006 |
| WO | 2007/018565 | 5/2007 |
| WO | 07/096878 | 8/2007 |
| WO | 2007/095204 | 8/2007 |
| WO | 2007/095904 | 8/2007 |
| WO | 2007/096877 | 8/2007 |
| WO | 2007/096878 | 8/2007 |
| WO | 08/007368 | 1/2008 |
| WO | 2008/007368 | 1/2008 |
| WO | 2008/048497 | 4/2008 |
| WO | 2008/087618 | 7/2008 |
| WO | 2008/102334 | 8/2008 |
| WO | 2008/102360 | 8/2008 |
| WO | 2008/143942 | 11/2008 |
| WO | 2008/145213 | 12/2008 |
| WO | 2008/145214 | 12/2008 |
| WO | 2008/145216 | 12/2008 |
| WO | 2008/145217 | 12/2008 |
| WO | 2009/080344 | 7/2009 |
| WO | 2009/104191 | 8/2009 |
| WO | 2010/052724 | 5/2010 |
| WO | 2010/052725 | 5/2010 |
| WO | 2010/147439 A2 | 12/2010 |

OTHER PUBLICATIONS

EP Communication dated Jan. 15, 2013 in related EP Patent Application No. 08710231.5.
EP Communication dated Jul. 18, 2012 in related EP Patent Application No. 08710231.5.
Pozar, D.M., "Chapter 4: Microwave Network Analysis," Microwave Engineering, 2nd ed., John Wiley & Sons, Inc., pp. 191-206, 1998 (23 pages).
Abstract of US2012/0125921 of May 24, 2012.
Abstract of US2006/0202032 of Sep. 14, 2006.
Agilent Technologies, Agilent AN 154 S-parameter design, Feb. 2000.
Communication Relating to the Results of the Partial International Search dated Oct. 24, 2007 From the International Searching Authority Re: Application No. PCT/IL/2007/000864.
International Preliminary Report on Patentability dated Jan. 13, 2009 From the International Bureau of WIPO Re: Application No. PCT/IL/2007/000864.
Communication Relating to the Results of the Partial International Search dated Aug. 4, 2008 From the International Searching Authority Re: Application No. PCT/IL/2008/000231.
Communication Relating to the Results of the Partial International Search dated Jul. 10, 2002 From the International Searching Authority Re: Application No. PCT/IL2007/000235.
Communication Relating to the Results of the Partial International Search dated Jul. 10, 2007 From the International Searching Authority Re: Application No. PCT/IL2007/000236.
Communication Relating to the Results of the Partial International Search dated Mar. 29, 2010 From the International Searching Authority Re: Application No. PCT/IL2009/001058.
International Preliminary Report on Patentability dated May 29, 2008 From the International Preliminary Examining Authority Re: Application No. PCT/IL2007/000236.
International Search Report and the Written Opinion dated Nov. 13, 2008 From the International Searching Authority Re: Application No. PCT/IL2008/000231.
International Search Report and the Written Opinion dated May 20, 2008 From the International Searching Authority by the Patent Cooperation Treaty Re: Application No. PCT/IL2007/001073.
International Search Report and the Written Opinion dated Dec. 27, 2007 From the International Searching Authority Re: Application No. PCT/IL2007/000864.

(56) References Cited

OTHER PUBLICATIONS

International Search Report and the Written Opinion dated Aug. 31, 2007 From the International Searching Authority by the Patent Cooperation Treaty Re: Application No. PCT/IL2007/000236.
International Search Report dated Mar. 3, 2010 from the International Searching Authority Re: Application No. PCT/IL2009/001057.
International Search Report dated Sep. 11, 2007 from the International Searching Authority by the Patent Cooperation Treaty Re: Application No. PCT/IL2007/000235.
Response dated Feb. 23, 2010 to the Written Opinion dated Nov. 25, 2009 From the International Searching Authority Re: Application No. PCT/IL2009/000199.
Evans "Electromagnetic Rewarming: The Effect of CPA Concentration and Radio Source Frequency on Uniformity and Efficiency of Heating", Cryobiology, 40:126-138, 2000.
Evans et al. "Design of a UHF Applicator for Rewarming of Cryopreserved Biomaterials", IEEE Transactions on Biomedical Engineering, 39(3): 217-225, Mar. 1992.
Hambling "Forget Lasers, Phasers and Other Beam Weapons—Radiofrequency Devices are Here, and They're Set to 'Sting'", Tech Watch: Forecasting Pain, 183(12):32, Dec. 2006.
Herring et al. "OSU Tunes Into a Cooking Innovation", OSU News & Communication Services, Oregon State University, 2p. Apr. 30, 2004.
Lapin N9GL's RF Safety Column: The Military's New RF Weapon, ARRL Handbook for Radio Amateurs, American Radio Relay League, 3p., 2001.
Liang et al. "Multiband Characteristics of Two Fractal Antennas", Microwave and Oprical Technology Letters, 23(4): 242-245, Nov. 20, 1999.
Penfold et al. "Control of Thermal Runaway and Uniformity of Heating in the Electromagnetic Rewarming of a Cryopreserved Kidney Phantom", Cryobiology, 30:493-508, 1993.
Robinson et al. "Rapid Electromagnetic Warming of Cells and Tissues", IEEE Transactions on Biomedical Engineering, 46(12): 1413-1425, Dec. 1999.
Shelley "Inside View on Deep Heat", Eureka Innovative Engineering Design, 2p., May 14, 2007.
Walker et al. "Fractal Volume Antennas", Electronic Letters, 34(16): 1536-1537, Aug. 6, 1998.
Wusteman et al., "Vitrification of Large Tissues with Dielectric Warming: Biological Problems and Some Approaches to Their Solution", Crybiology, 48:179-189, 2004.
International Search Report and the Written Opinion dated Jun. 15, 2010 From the International Searching Authority Re: Application No. PCT/IL2009/001058.
Communication Relating to the Results of the Partial International Search Report dated Aug. 4, 2008 From the International Searching Authority Re: Application No. PCT/IL2008/000231.
International Preliminary Report on Patentability dated Aug. 26, 2008 From the International Bureau of WIPO Re: Application No. PCT/IL2007/000235.
International Preliminary Report on Patentability dated Sep. 11, 2007 From the International Preliminary Examining Authority by the Patent Cooperation Treaty Re: Application No. PCT/IL2007/000235.
International Search Report dated Nov. 13, 2008 From the International Searching Authority Re: Application No. PCT/IL2008/000231.
International Search Report dated May 20, 2008 From the International Searching Authority by the Patent Cooperation Treaty Re: Application No. PCT/IL2007/001073.
International Search Report dated Aug. 31, 2007 From the International Searching Authority by the Patent Cooperation Treaty Re: Application No. PCT/IL2007/000236.
Notification of Transmittal of the International Search Report dated Dec. 27, 2007 From the International Searching Authority by the Patent Cooperation Treaty Re: Application No. PCT/IL2007/000864.

Written Opinion dated Nov. 13, 2008 From the International Searching Authority Re: Application No. PCT/IL2008/000231.
Written Opinion dated May 20, 2008 From the International Searching Authority Re: Application No. PCT/IL2007/001073.
Written Opinion dated Dec. 27, 2007 From the International Searching Authority Re: Application No. PCT/IL2007/000864.
Written Opinion dated Aug. 13, 2007 From the International Searching Authority Re: Application No. PCT/IL2007/001073.
Lapin N9GL's RF Safety Column: The Military's New RF Weapon, ARRL Handbook for Radio Amateurs, ARRL Web: N9GL's RF Safety Column: The Military's New RF Weapon.
Communication Pursuant to Article 94(3) EPC dated Apr. 29, 2010 From the European Patent Office Re: Application No. 07706172.9.
International Search Report and the Written Opinion dated Jun. 24, 2010 From the International Searching Authority Re: Application No. PCT/IL2009/001059.
Communication Relating to the Results of the Partial International Search dated Aug. 3, 2009 From the International Searching Authority Re: Application No. PCT/IL2009/000199.
International Preliminary Report on Patentability dated Aug. 26, 2009 From the International Bureau of WIPO Re: Application No. PCT/IL2007/001073.
International Search Report and the Written Opinion dated Nov. 25, 2009 From the International Searching Authority Re: Application No. PCT/IL2009/000199.
Boström et al. "Rapid Thawing of Fresh-Frozen Plasma With Radio Wave-Based Thawing Technology and Effects on Coagulation Factors During Prolonged Storage at 4° C.", Vox Sanguinis, 97: 34-38, 2009.
Official Action dated Jun. 3, 2010 From the U.S. Appl. No. 12/217,167.
Adams "Microwave Blood Plasma Defroster", Journal of Microwave Power and Electromagnetic Energy, 26(3): 156-159, 1991.
Arens et al. "Danger of Overwarming Blood by Microwave", JAMA, 218(7):1045-1046, 718, Nov. 15, 1971.
Collin "Electromagnetic Theory: Wave Equation", Foundations for Microwave Engineering, IEEE Press Series on Electromagnetic Wave Theory, $2^{nd}$ Ed., Chap. 2.4:31-32, 2001.
Collin "Transmission Lines and Waveguides", Foundations for Microwave Engineering, IEEE Press Series on Electromagnetic Wave Theory, $2^{nd}$ Ed. p. 96-99, 2001.
Geedipalli et al. "Heat Transfer in a Combination Microwave-Jet Impingement Oven", Food and Bioproducts Processing, 86:53-63, 2008.
Hirsch et al. "Indicators of Erythocyte Damage After Microwave Warming of Packed Red Blood Cells", Clinical Chemistry, 49(5):792-799, 2003.
Hirsch et al. "Temperature Course and Distribution During Plasma Heating with a Microwave Device", Anaesthesia, 58: 444-447, 2003.
Khummongkol et al. "Heat Transfer Between Impinging Air and Impinged Surface: A Factorial Design", The Joint Internation Conference on Sustainable Energy and Environment (SEE), Hua Hin, Thailand, Dec. 1-3, 2004, 4-003(O): 431-436, 2004.
Marcroft et al. "Flow Field in a Hot Air Jet Impingement Oven-Part I: A Single Impinging Jet", Journal of Food Processing Preservation, 23:217-233, 1999.
Marcroft et al. "Flow Field in a Hot Air Jet Impingement Oven-Part II: Multiple Impinging Jets", Journal of Food Processing Preservation, 23:235-248, 1999.
Risco "Microwaves and Vascular Perfusion: Obtaining Very Rapid Organ Cooling". Cryobiology, 49:294, Abstract No. 11, 2004.
Robinson et al. "Electromagnetic Re-Warming of Cryopreserved Tissues: Effect of Choice of Cryoprotectant and Sample Shape on Uniformity of Heating", Physics in Medicine and Biology, 47:2311-2325, 2002.
Sherman et al. "A New Rapid Method for Thawing Fresh Frozen Plasma", Transfusion, 14(6):595-597, Nov.-Dec. 1974.
Söhngen et al. "Thawing of Fresh-Frozen Plasma With A New Microwave Oven", Transfusion, 28(6): 576-580, 1988.

\* cited by examiner

DYNAMIC IMPEDANCE MATCHING IN RF RESONATOR CAVITY

RELATED APPLICATIONS

This application is a continuation application of co-pending U.S. patent application Ser. No. 12/230,431, filed Aug. 28, 2008, which claims the benefit of U.S. Provisional Patent Applications Nos. 60/935,787 and 60/935,788, both of which were filed on Aug. 30, 2007, both of whose benefit under 35 USC 119(e) is claimed, are also incorporated herein by reference in their entireties.

The teachings of PCT Patent Applications Nos. PCT/IL2007/000864 filed on Jul. 10, 2007, PCT/IL2007/000235 filed on Feb. 21, 2007 and PCT/IL2007/000236 filed on Feb. 21, 2007, are incorporated herein by reference.

The teachings of U.S. Provisional Patent Applications Nos. 60/924,555 filed on May 21, 2007, 60/806,860 filed on Jul. 10, 2006 and 60/775,231 filed on Feb. 21, 2006 are also incorporated herein by reference in their entireties.

FIELD OF THE INVENTION

The invention relates to heating materials by electromagnetic radiation. Some embodiments relate to heating materials in a microwave oven.

BACKGROUND

Matching the impedance of an RF feed, (antenna) including the resonant cavity, while the resonator optionally includes a load such as food, with the impedance of the RF source increases the efficiency of energy delivery into the resonator and the load. When impedances are perfectly matched no power reflection exists and all transmitted energy is absorbed by the load. As the impedance becomes unmatched, the reflections increase and consequently heating efficiency decreases.

Measuring the reflection from a resonant cavity (return loss) in a microwave oven and modifying the impedance of the feed or the cavity to reduce reflections, or modifying the feed frequency to match the impedance in a microwave oven are described, for example, in U.S. Pat. No. 5,347,108 or 4,415,789 or J. D. Penfold, et al., *Control of Thermal Runaway and Uniformity of Heating in* 20 *the Electromagnetic Warming of a Cryopreserved Kidney Phantom*, in *Cryobiology* 30, 493-508 (1993), the disclosures of which are incorporated herein by reference.

SUMMARY OF THE INVENTION

A broad, non limiting, aspect of exemplary embodiments of the invention relates to heating a load ('object') such as food in a resonant cavity by RF radiation (e.g. a microwave oven). The RF feed (transmitter) sweeps over a plurality of frequencies, determining at each frequency the absorption of the radiation energy. Subsequently the system selects to radiate at frequencies that optimize the heating goals, such selection, for example, may correspond to selecting the most efficient absorption frequencies to gain faster heating, or to selecting somewhat less efficient absorption frequencies to gain more uniform heating. The amount of power allocated to each frequency may also be varied according to the absorption in each frequency. As the object (and cavity) is heated, the absorption characteristics may change and, therefore, the frequency sweep to probe the absorption frequency ranges is repeated, dynamically determining at which frequencies to radiate.

Such methods and devices are described in U.S. Provisional Patent Application No. 60/935,788 titled "DRYING APPARATUS AND METHODS AND ACCESSORIES FOR USE THEREWITH" filed on Aug. 30, 2007, the disclosure of which is incorporated herein by reference.

Additionally, without limiting, exemplary embodiments of the invention relate to a system comprising a resonant cavity having one or more ports wherein the cavity may comprise a load such as a food. In exemplary embodiments of the invention, the system scattering parameters (s-parameters, Sij), that is, the reflection and transmission coefficients between the incident and reflected waves, are determined and characterize the energy transfer behavior of the system. In addition to the s-parameters, selection of transmitting frequencies may be determined by other factors, such as the efficiency of the RF power amplifier at each frequency. By applying RF energy at a port and measuring the reflected RF energy via one or more ports the s-parameters may be obtained. The derivation and some usage of s-parameters are described, for example, in David M. Pozar, *Microwave Engineering*. $2^{nd}$ edition, John Wiley & Sons, Inc. (ISBN 0-471-17096-8), or *Agilent Application Note AN* 154 (http://www.sss-mag.com/pdf/AN154.pdj), the disclosures of which are incorporated herein by reference.

For example, when the s-parameters are characterized by magnitude and phase the impedance of the system may be derived. As another example, the loss (i.e. the energy absorbed by the cavity) may be derived. Optionally or alternatively, when the s-parameters are characterized by magnitude only, the resistance rather than the impedance of the system can be derived.

In an exemplary embodiment of the invention, by radiating the cavity with a plurality of frequencies the absorption characteristic in a frequency or frequency band can be determined. Optionally, according to the shape of the absorption (loss) as a function of frequency the absorption in the cavity construction (e.g., sharp curve, high Q) can be differentiated from an absorption in the load such as food (e.g., broad curve, low Q).

An aspect of some exemplary embodiments of the invention relates to dynamically matching the impedance of a system comprising a resonant cavity to the impedance of a radiation source responsive to a determined impedance of the system.

In exemplary embodiments of the invention, assuming the impedance of the source is R0 (e.g. 50Ω), the impedance of the system, $Z=R+jX$, is determined and consequently the impedance is matched by modifying the impedance of the system (e.g. adding impedance $(R0-R)-jX$) such that $Z=R0$. Optionally, the impedance matching is performed for a particular frequency or frequencies.

In exemplary embodiments of the invention, the system is irradiated by a frequency band and for each frequency $f_i$ in the band the system has a different impedance, the impedance matching is approximated such that $Z \approx R0$. Optionally, the approximation is derived by an optimization, for example, minimizing the sum of differences $|(R0-Rf_i)-jXf_i|$, where $Zf_i=Rf_i+jXf_i$ is the impedance of the system for a particular frequency $f_i$.

In exemplary embodiments of the invention, at least some of the s-parameters are obtained and the system impedance is derived dynamically during the course of irradiation such as during heating. Optionally, the characteristics of the system vary due to heating of the cavity and/or the load.

Accordingly, the impedance matching is repeated, if needed, dynamically matching the impedance during the course of irradiation, such as during heating.

An aspect of some exemplary embodiments of the invention relates to dynamically matching the impedance of a system comprising a resonant cavity to the impedance of a RF source responsive to calculated absorption intensities in the cavity.

In exemplary embodiments of the invention, the absorption efficiency and the impedance of the system at a particular frequency or frequency band are calculated based on the s-parameters of the system. By varying the impedance used in the calculations relative to the determined impedance, the calculated absorption intensities are maximized and the respective impedance that maximized the absorption is set for the system. Optionally or alternatively, other goals may be used in the calculation, for example, finding the impedance that minimizes the absorption at a particular frequency or frequency band such as absorption in the cavity walls or parts of a load such as a package as opposed to its contents. Optionally, the s-parameters and the derived impedance are repeatedly obtained for a particular frequency or frequencies during the course of heating, and are used for dynamically matching the impedance of the system that might have changed during heating. Optionally or alternatively, the goal may be optimization of the absorption in the frequency band, such that the variance of absorption is the least through the band or so that the average absorption in the band is maximized. Optionally or alternatively, the goal may include consideration of the absorption of energy by other antennas in the system.

In an exemplary embodiment of the invention, a plurality of goals are optimized simultaneously, optionally by providing a unique weight for each goal.

An aspect of some exemplary embodiments of the invention relates to dynamically matching the impedance of a system comprising a resonant cavity to the impedance of a RF source responsive to determined absorption intensities in the cavity.

Contrary (or additionally) to methods where impedance is matched for a certain frequency in a fixed frequency range, or where the transmitted frequency is shifted to a frequency which is absorbed better, in exemplary embodiments of the invention the impedance matching is based on maximizing the absorption of energy at any frequency range of a feed with variable plurality of frequencies. Optionally, the particular bands comprise the frequencies that are absorbed in the load. Optionally or alternatively, another goal may be used, for example, determining the impedance that minimizes the absorption at a particular frequency or frequency band such as absorption in the cavity walls. Optionally, a plurality of goals may be used, optionally by providing a unique weight for each goal.

In exemplary embodiments of the invention, the feed sequentially radiates (sweep) at different frequency bands and the absorption efficiency for the corresponding band is determined and the impedance of the system is varied to increase the absorption efficiencies. Optionally the impedance is matched for bands where a load absorbs the radiation so that irradiating at that band will impart more energy into load. In some embodiments, the impedances of the system may change during the course of radiation (heating) due, for example, to change in the dielectric properties of the load. Optionally, the frequency dependent impedance matching is performed repeatedly during the radiation operation, dynamically adapting to the changes.

In exemplary embodiments of the invention, the impedance variation can be predicted from preceding changes and/or preceding change in the absorption intensity at particular band or bands. Optionally, an impedance or impedance change can be estimated based data recorded on earlier heating courses. Optionally, an impedance or impedance change is estimated based on the cavity dimensions and/or the object material and/or size and/or geometry. Optionally the impedance is calculated from full and/or partial (i.e. without phase component) s-parameters.

In exemplary embodiments of the invention, the cavity comprises at least one antenna that radiates the electromagnetic energy into the cavity from at least one feed. In exemplary embodiments of the invention, the cavity comprises at least one antenna that receives the reflected energy from the cavity. Optionally, a same antenna, or part thereof, is used for both radiation and reception.

In exemplary embodiment of the invention, the impedance matching of the system is carried out by an impedance variation unit optionally comprising electrical passive elements such as one or more capacitors, or one or more coils or one or more resistors or one or more transformers. Optionally, the impedance variation unit is located between the RF source and the feed (port). Optionally or alternatively, the impedance matching of the system is carried out by moving one or more elements in the cavity and/or changing the load placement and/or the antenna physical characteristics, such as the distance of an antenna from the cavity wall or changing an antenna shape.

Terms

In the specification and claims, unless otherwise specified, the terms 'load' or 'object' denote a removable object added to the cavity, such as food, tissue, chemicals, cloth, clothes or other objects, and the term 'cavity' denotes a cavity optionally comprising an object, and the term 'system' denotes an apparatus comprising a cavity, one or more antennas, optional elements in the cavity, an optional load and one or more ports (or feeds).

In the specification and claims, unless otherwise specified, the term 'port' or 'feed' denotes an electromagnetic system receiving a single electric signal and converting it to electromagnetic energy using one or more radiating elements.

In the specification and claims, unless otherwise specified, the term 'source' denotes an electrical apparatus that provides RF energy, optionally at a plurality of frequencies, towards a port, wherein a port optionally comprises an antenna, optionally comprising a plurality of radiating elements, and the term 'sweep' (or inflections thereof) denotes irradiating at a plurality of frequencies and/or frequency bands, optionally sequentially.

In the specification and claims, unless otherwise specified, the term 'band' denotes a small width of frequencies relative to the frequencies extent of the source and the term 'heating' (or inflections thereof) denotes a duration of irradiation into the cavity, optionally irradiation at a plurality of frequencies or bands.

In the specification and claims, unless otherwise specified, the suffix '$f_i$' denotes a value pertaining to a certain frequency or band $f_i$, for example, $Zf_i$ may denote a system impedance at frequency or band $f_i$.

According to an aspect of some embodiments of the present invention there is provided a method for matching an impedance of a system comprising a cavity and one or more feeds to an impedance of one or more sources of electromagnetic radiation irradiating a plurality of frequencies into the cavity via the feeds, comprising:

(a) determining the system impedance of the system for a frequency band; and (b) modifying the system impedance to obtain a better match between the impedance of the system and the impedance of the one or more sources.

According to some embodiments of the invention, the system impedance is determined by a plurality of s-parameters of the system.

According to some embodiments of the invention, the plurality of frequencies comprises RF radiation in a microwave region.

According to some embodiments of the invention, a frequency band comprises a smaller bandwidth relative to the source's plurality of frequencies.

According to some embodiments of the invention, determining a plurality of s-parameter comprises:

(a) irradiating one or more frequency bands into the cavity by one or more antennas;

(a) measuring reflected energy by one or more antennas; and (b) determining one or more relations between the reflected energy and the irradiated energy at one or more bands.

According to some embodiments of the invention, the impedance of at least one source is a resistance.

According to some embodiments of the invention, the resistance of at least one source is 50Ω.

According to some embodiments of the invention, the system impedance comprises a combination of the impedance of the feed and the cavity.

According to some embodiments of the invention, varying the impedance of the feed comprises varying at least one of the capacitance or induction or resistance or transformer's impedance ratio in the feed.

According to some embodiments of the invention, varying the impedance of the cavity comprises moving a one or more elements inwards or outwards in the cavity.

According to some embodiments of the invention, varying the impedance of the cavity comprises moving an element in the cavity.

According to some embodiments of the invention, varying the impedance of the cavity comprises varying the shape of an element in the cavity.

According to some embodiments of the invention, the cavity is a resonant cavity.

According to some embodiments of the invention, the cavity contains a removable added object.

According to some embodiments of the invention, the object is heated by the irradiated energy.

According to some embodiments of the invention, the object comprises food.

According to some embodiments of the invention, the system impedance comprises a combination of the impedances of the feed, of the cavity and of the object.

According to some embodiments of the invention, varying the impedance of the cavity comprises moving the object in the cavity.

According to some embodiments of the invention, the impedance matching is repeated a plurality of times during the irradiation.

According to an aspect of some embodiments of the present invention there is provided a method for determining a match of an impedance of a system comprising a cavity and one or more feeds to an impedance of one or more sources of electromagnetic radiation irradiating a plurality of frequencies into the cavity via the feeds, comprising:

(a) determining a plurality of s-parameter of the system for a frequency band;

(b) calculating an absorption intensity in the cavity at the band; and (c) enlarging the calculated absorption at the band by varying an impedance of at least the feed or the cavity.

According to some embodiments of the invention, enlarging the calculated absorption comprises maximizing the calculated absorption.

According to some embodiments of the invention, maximizing comprises maximizing within a threshold.

According to an aspect of some embodiments of the present invention there is provided a method for improving an absorption of electromagnetic energy from a source irradiating at a plurality of frequencies into a cavity via one or more feeds in a system comprising the cavity and the feeds, comprising:

(a) determining a plurality of s-parameter of the system for a frequency band;

(b) determining an absorption intensity in the cavity at the band; and (c) enlarging the absorption at the band by varying the impedance of at least one of the feed, the feed matching circuitry and the cavity.

According to some embodiments of the invention, enlarging the absorption comprises maximizing the absorption.

According to some embodiments of the invention, maximizing comprises maximizing within a threshold.

According to some embodiments of the invention, improving the absorption is repeated a plurality of times during the irradiation.

According to some embodiments of the invention, varying the impedance of at least the feed or the cavity is performed responsive to a predefined change in the energy absorption at one or more frequencies.

According to an aspect of some embodiments of the present invention there is provided an electromagnetic radiation heater adapted to perform the method described above.

Unless otherwise defined, all technical and/or scientific terms used herein have the same meaning as commonly understood by one of ordinary skill in the art to which the present invention pertains. Although methods and materials similar or equivalent to those described herein may be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Non-limiting examples of embodiments of the present invention are described with reference to figures listed below. Identical or equivalent structures, elements or parts that appear in some figures are labeled with the same numerals.

DETAILED DESCRIPTION OF EMBODIMENTS OF THE INVENTION

The non-limiting headings that follow are intended for clarity only.

Matching by Determined Impedance

In exemplary embodiments of the invention, s-parameters optionally comprising at least the parameters required for determination of the system impedance are obtained. Optionally, the s-parameters corresponding to a frequency band are obtained by radiation a band by one or more ports, optionally one at a time, with one or more antennas and receiving the reflected radiation by one or more ports with one or more antennas. Optionally, a transmitting antenna, or part thereof comprises a receiving antenna that receives a reflected and/or irradiated radiation.

In exemplary embodiments of the invention, the system impedance corresponding to a band is determined.

In exemplary embodiments of the invention, obtaining the s-parameters and/or the determination of the system impedance is repeated, to dynamically obtain the impedance that may vary during heating.

Figure 4:
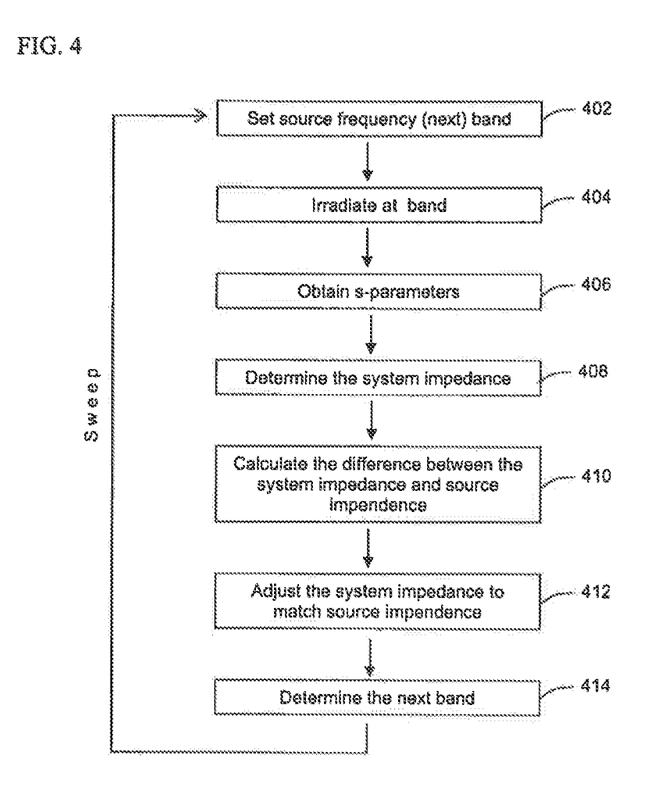
FIG. 4 illustrates a flowchart depicting a framework of impedance matching according to a determined impedance of the system, in accordance with an exemplary embodiment of the invention.

FIG. 4 illustrates a flowchart depicting a framework of impedance matching according to a determined impedance of the system, in accordance with an exemplary embodiment of the invention.

In exemplary embodiments of the invention, the source is set to a certain frequency band (402) and the cavity is irradiated (404) by at least one antenna with electromagnetic radiation at the frequency band. The reflected energy is received with at least one antenna and the s-parameters are obtained (406).

In exemplary embodiments of the invention, the impedance of the system $Zf_i$, $Rf_i+jXf_i$, is determined (408) based on the obtained s-parameters. The difference between the system impedance $Zf_i$ and the impedance of the source Z0, $R0+jX0$ (or resistance R0) is calculated (410). Optionally, the difference $dZf_i$ is equal or equivalent or approximates the formula $dZf_i=(R0-Rf_i)+j(X0-Xf_i)$.

In exemplary embodiments of the invention, the system impedance is adjusted (412), such as by adding the value $dZf_i$, to match or approximate the impedance source Z0 (or R0).

In exemplary embodiments of the invention, another band is determined (414) and the sequence is repeated as described above.

In exemplary embodiments of the invention, a band comprises a plurality of frequencies f, wherein f comprises and denotes a plurality of frequencies $f_i$, so that determining impedance difference dZf from the system impedance Zf may not match the source impedance Z0 accurately (up to s-parameters measurements and/or impedance calculations accuracy). In such a case, optionally, the impedance differences $dZf_i$ in the frequency range f of the band are determined to find a difference dZf that will yield an approximation of the source impedance Z0. Optionally, dZf is determined by an optimization such as by minimizing the sum of magnitudes of $dZf_i$, $\min\Sigma|dZf_i|$. Optionally, other optimization methods may be used to derive a difference dZf that will obtain a close match with Z0. Optionally, sufficient match denotes a match within a certain threshold. Optionally or alternatively, a sufficient match is such that the absorption intensity at the band is enlarged to a maximal value or close within a threshold to the maximal value (see later).

In an exemplary embodiment of the invention, impedance matching performs during sweep and repeated from time to time to accommodate to the impedance change during the heating.

Matching by Calculated Absorption

In exemplary embodiments of the invention, s-parameters optionally comprising at least the parameters required for determination of the system impedance are obtained. Optionally, the s-parameters corresponding to a frequency band are obtained by radiation a band by one or more ports with one or more antennas, optionally one at a time, and receiving the reflected radiation by one or more ports with one or more antennas. Optionally, a transmitting antenna, or part thereof comprises a receiving antenna that receives a reflected and/or irradiated radiation.

In exemplary embodiments of the invention, the system impedance corresponding to a plurality of frequencies in the band is determined and the absorption intensity at the band is calculated. Subsequently a different impedance is assumed and the absorption efficiency is calculated, aiming to achieve a maximal absorption intensity. Optionally, the maximal absorption intensity (up to a certain threshold) is obtained when the assumed system impedance matches or approximates the source impedance. Consequently, the assumed impedance is set so that the impedances actually match or approximated.

In exemplary embodiments of the invention, since the characteristics of the cavity may change during heating, the operation is repeated to dynamically match the impedances of the system and the source.

Figure 5:
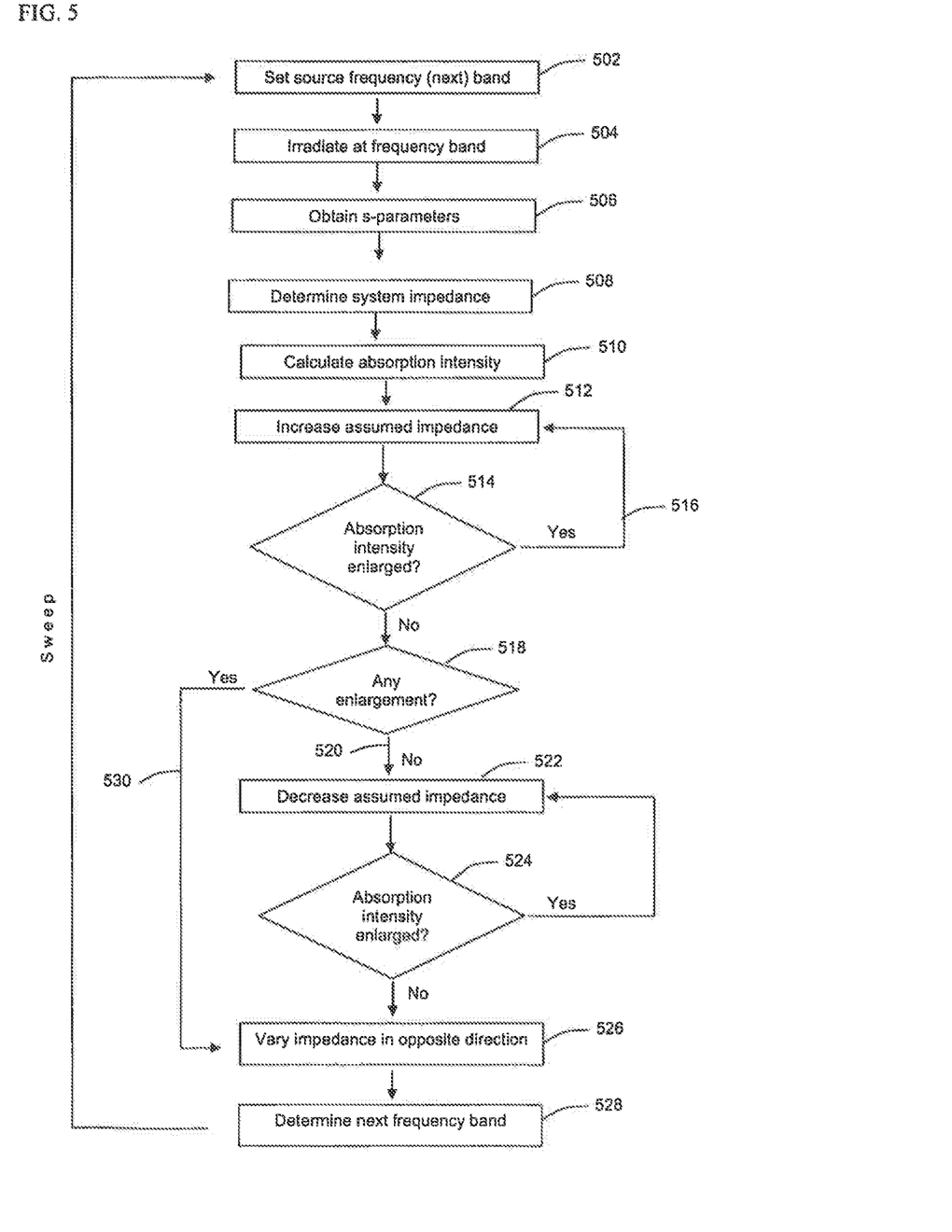
FIG. 5 illustrates a flowchart depicting a framework of impedance matching according to calculated absorptions, in accordance with an exemplary embodiment of the invention.

FIG. 5 illustrates a flowchart depicting a framework of impedance matching according to calculated absorptions, in accordance with an exemplary embodiment of the invention.

In exemplary embodiments of the invention, the source is set to a certain frequency band (502) and the cavity is irradiated (504) by at least one antenna with electromagnetic radiation at the frequency band. The reflected energy is received with at least one antenna and the s-parameters are obtained (506). According to the s-parameters the system impedance is determined (508), and the absorption intensity at the band is calculated (510).

In the following discussion, increasing (or decreasing) an impedance Z=R+jX denotes increasing (or decreasing) the resistance component R and/or the reactance component X. For example, if X is a capacitance reactance, increasing the reactance X comprises increasing the capacitance reactance and/or decreasing the induction reactance.

In exemplary embodiments of the invention, starting from the actual system impedance an assumed impedance is increased (512) and the absorption intensity is calculated again and checked whether the intensity is enlarged (514). If the absorption intensity is enlarged (516) the impedance is further increased (512), and checked (514) whether the intensity keeps enlarging or reduces. If the absorption intensity reduces after enlargement (518) the feed impedance is varied (120) in opposite direction (decrease), optionally slightly, to restore or approximate the largest absorption intensity.

If increasing the system impedance did not enlarge the calculated absorption intensity (520), the assumed system impedance is decreased (522) and checked whether the calculated absorption intensity is enlarged (524). The assumed system impedance is decreased (522) until the calculated absorption intensity reduces. Consequently, the feed impedance is varied (526) in opposite direction (increase), optionally slightly, to restore or approximate the largest absorption intensity. The final assumed system impedance is set as the maximal (up to a threshold) calculated absorption intensity corresponds to matching the impedance of the system and the source.

Subsequently the next band is determined (528) and the operation is repeated (530) to match the impedances at the new frequency band, such that the impedance is modified dynamically during the course of radiation (heating).

In exemplary embodiments of the invention, the order of increase and decrease of the impedance may be reversed, namely, the assumed impedance is firstly decreased and then increased.

In exemplary embodiments of the invention, the acts for increasing the absorption intensity by varying the impedance may comprise a binary search or a successive approximation method, optionally both on a complex plane or on a real axis. Namely, the variation is started with a large change followed by smaller changes to converge at a maximal calculated absorption intensity or close to the maximal absorption intensity (up to a certain threshold). Optionally or alternatively, other goal searching methods may be used to find a maximal absorption intensity (up to a threshold) for a given band.

In exemplary embodiments of the invention, the absorption intensity at a certain band is already at the maximum or close to it (up to a threshold), so that changing the impedance will reduce the absorption intensity. Therefore, the impedance is varied, at least initially, in small steps so that the absorption intensity will not reduce significantly (beyond a certain threshold). Optionally, the correction operation (526) will restore the maximal absorption intensity or close to the maximal value (up to a certain threshold).

In exemplary embodiment of the invention, the impedances are changed in order to maximize the energy coupling to the resonator and optionally load at a band of frequencies. That way, the impedance of every frequency in the band may not be optimal, but the absorption efficiency function is optimized, so the energy coupling is maximized at the whole band.

In exemplary embodiments of the invention, without limiting, a goal for maximization as described above, such as maximizing the absorption intensity, can be substituted for another goal such as minimizing the absorption intensity at a certain band or reaching a value such as 50% of the maximal value, or any desired value.

In an exemplary embodiment of the invention, the goal is optimization of the absorption in the frequency band, such that the variance of absorption is the least through the band or the average absorption in the band is maximized. Optionally or alternatively, the goal may include consideration of the absorption by the other antennas in the system.

In an exemplary embodiment of the invention, plurality of goals are optimized simultaneously, optionally by providing a unique weight for each goal.

In exemplary embodiments of the invention, the impedance variation can be predicted or estimated from preceding changes in the calculated absorption intensity and/or based on past operations and/or simulations.

Matching by Determined Absorption

In exemplary embodiments of the invention, the system impedance is varied (matched) to maximize the absorption intensity at a particular frequency band. Optionally, the maximizing is in order to impart maximal energy to the cavity and/or object at the particular frequency band.

Figure 1:
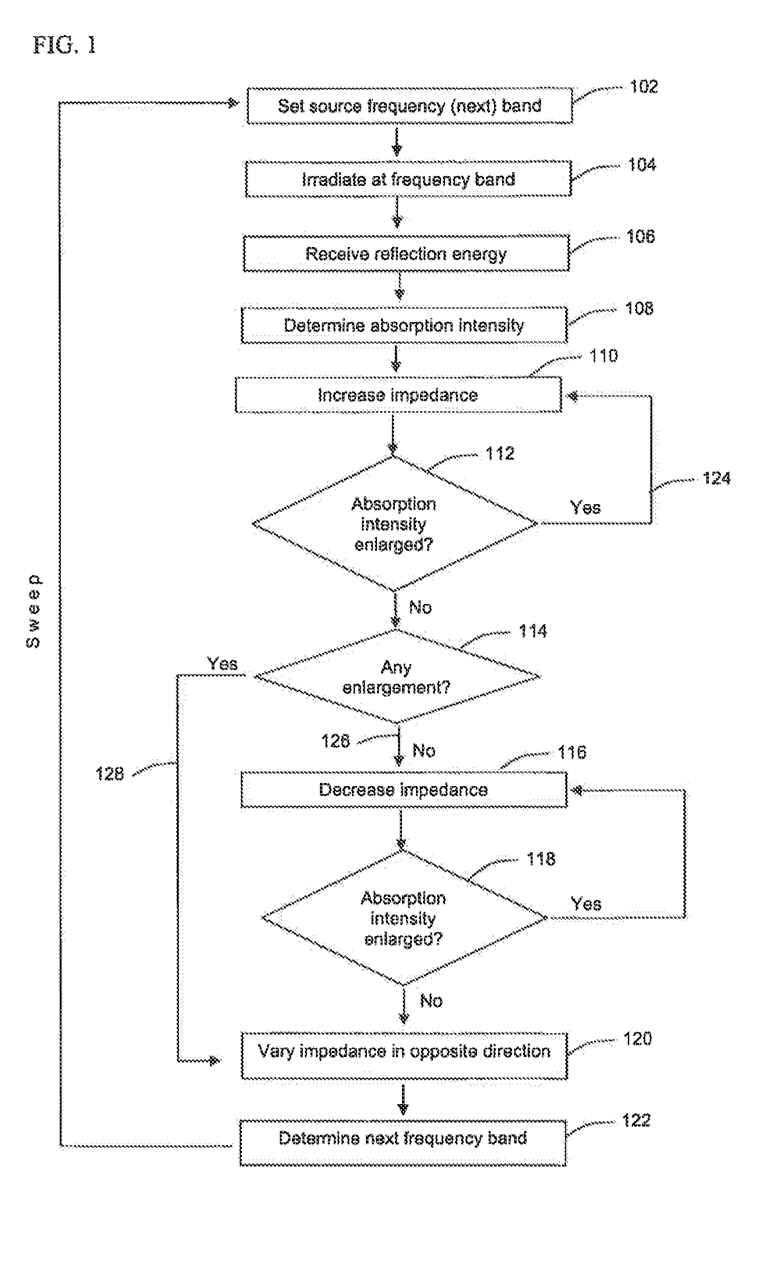
FIG. 1 illustrates a flowchart depicting a framework of impedance matching operation with no a-priori information regarding the impedances, in accordance with an exemplary embodiment of the invention.

FIG. 1 illustrates a flowchart depicting a framework of impedance matching operation with optionally no a-priori information regarding the impedances, in accordance with an exemplary embodiment of the invention.

In exemplary embodiments of the invention, the source is set to a certain frequency band (102) and the cavity, optionally with an object such as food, is irradiated (104) by at least one antenna, optionally one at a time, with electromagnetic radiation at the frequency band. The reflected energy is received (106) with at least one antenna and the absorption intensity is determined (108).

In exemplary embodiments of the invention, system impedance is increased (110) and the absorption intensity is determined again and checked whether the intensity is enlarged (112). If the absorption intensity is enlarged (124) the system impedance is further increased (110), and checked (112) whether the intensity keeps enlarging or reduces. If the absorption intensity reduces after enlargement (114) the system impedance is varied (120) in opposite direction (decrease), optionally slightly, to restore or approximate the largest absorption intensity.

If increasing the feed impedance did not enlarge the absorption intensity (126), the system impedance is decreased (116) and checked whether the absorption intensity is enlarged (118). The system impedance is decreased (116) until the absorption intensity reduces. Consequently, the system impedance is varied (120) in opposite direction (increase), optionally slightly, to restore or approximate the largest absorption intensity.

Subsequently the next band is determined (122) and the operation is repeated (128) to match the impedances at the new frequency band, such that the impedance is modified dynamically during the course of radiation (heating).

In exemplary embodiments of the invention, the order of increase and decrease of the impedance may be reversed, namely, the feed impedance is firstly decreased and then increased.

In exemplary embodiments of the invention, the acts for increasing the absorption intensity by varying the impedance may comprise a binary search or a successive approximation method, optionally both on a complex plane or on a real axis. Namely, the variation is started with a large change followed by smaller changes to converge at a maximal absorption intensity or close to the maximal absorption intensity (up to a certain threshold). Optionally or alternatively, other goal searching methods may be used to find a maximal absorption intensity (up to a threshold) for a given band.

In exemplary embodiments of the invention, the absorption intensity at a certain band is already at the maximum or close to it (up to a threshold), so that changing the impedance will reduce the absorption intensity. Therefore, the impedance is varied, at least initially, in small steps so that the absorption intensity will not reduce significantly (beyond a certain threshold). Optionally, the correction operation (120) will restore the maximal absorption intensity or close to the maximal value (up to a certain threshold).

In exemplary embodiment of the invention, the impedances are changes in order to maximize the energy coupling to the resonator and optionally load at a band of frequencies. That way, the impedance of every frequency in the band may not be optimal, but the absorption efficiency function is optimized, so the energy coupling is maximized at the whole band. The whole transmitted band may be divided to several sub band, during the transmission sweep, which are matched in turn.

In exemplary embodiments of the invention, without limiting, a goal for maximization as described above, such as maximizing the absorption intensity, can be substituted for another goal such as minimizing the absorption intensity at a certain band or reaching a value such as 50% of the maximal value, or any desired value.

In exemplary embodiments of the invention, the impedance variation can be predicted or estimated from preceding changes in the calculated absorption intensity and/or based on past operations and/or simulations.

When employing impedance matching according to measured absorption intensities, in exemplary embodiments of the invention, the cavity comprises a plurality of antennas. In such a case, as the impedance of a first antenna is matched and then the impedance of a second antenna is matched, the matching of the first antenna is altered (and so for plurality of antennas). However, when the impedance of the first antenna is matched again, altering the impedance matching for the second antenna, the alteration is smaller, and matching the impedance of the first antenna again alters the impedance matching of the second antenna by yet a smaller amount. Accordingly, iterated successive impedance matching of a plurality of antennas reduces the successive alterations, and the impedances converge (up to a threshold) to that of the source (or other desired goals). The iterations of successive matching are carried out until the change is sufficiently small (e.g. below a certain threshold) or the impedance is sufficiently close (up to a difference threshold) to the objective (e.g. the impedance of the source). Optionally or alternatively, the number of the iterations of successive matching is limited, such as to a predefined number.

In exemplary embodiments of the invention, successive impedance matching for a plurality of antennas as described above is optionally employed as a single impedance matching operation (as a single matching in case of a single antenna).

In exemplary embodiments of the invention, the effect of impedance matching of one antenna on the impedance matching of another antenna is more pronounced when there is a large coupling between the antennas relative to a case with less coupling. Yet, frequencies at which there is a large coupling between antennas (e.g. beyond a certain coupling level) may not be of interest for heating an object (less absorption by the object) so that the iteration of successive impedance matching of the plurality of antennas may be avoided or performed only partially, such as stopping before a sufficient convergence is achieved.

It should be noted that using the other methods for impedance matching, namely by determining the impedance or calculating the absorption, the successive impedance matching is not required since they are based on the characterization of the system by the s-parameters.

Repetition (Dynamic Operation)

In exemplary embodiments of the invention, impedance matching such as discussed above are repeated.

In exemplary embodiments of the invention, the repetition is periodic, for example, every 1 second. Optionally, the repetition period is lower than 1 second, for example, 500 ms or 100 ms or 50 ms or 10 ms or 5 ms. Optionally, the repetition period higher than 1 second, for example, 2 s, 5 s or 10 s. Optionally, the repetition period varies during the course of heating. Optionally, the repetition period increases as the temperature of the cavity and/or object increases. Optionally or alternatively, the repetition is based on the repetition of the radiation sweep. Optionally or alternatively, the rate is based on preceding rates. Optionally or alternatively, the repetition rate is based on the rate of change of one or more s-parameters and/or determined impedance. Optionally or alternatively, the impedance variation is repeated if the absorption intensity at one or more bands is changed beyond a certain threshold.

In exemplary embodiments of the invention, the repetition period is estimated based on past experiments or simulations, optionally with respect to the cavity dimensions and/or object weight and/or object volume and/or object material and/or object geometry. Optionally or alternatively, the repetition rate is based on past heating and/or calculations and/or simulations.

In exemplary embodiments of the invention, the impedance matching operation at a particular band is performed while other bands are irradiated into the cavity, at least by one antenna. Optionally the irradiation by other bands heats the cavity and/or object at particular bands where the absorption is larger relative to other bands. Optionally the absorption at a particular band is larger as a result of a preceding impedance matching.

Thresholds

In exemplary embodiments of the invention, reaching a certain value such as matching the system impedance of the source or maximizing an absorption intensity may not be absolutely or practically accurate. Therefore, the values are determined within or up to a certain threshold.

In exemplary embodiments of the invention, a match between the system impedance $Z=R+jX$ and the source impedance $Z0=R0+jX0$ (or $R0$) may be considered successful if the absolute impedance of the system $|Z|$ is within a given percentage relative to the absolute source impedance $|Z0|$. Optionally the threshold is 1% or 5% or 10% or 20%, or any intermediate thereof, relative to the source impedance $|Z0|$ or $R0$. Optionally or alternatively, the threshold is a preset value such as $0.5\Omega$ or $1\Omega$ or $5\Omega$ or $10\Omega$ or $20\Omega$ or any intermediate value thereof.

In exemplary embodiments of the invention, the threshold for determining a maximal absorption intensity (or other value such as minimum intensity) is a percentage of the current value, for example, 5% of the maximal absorption intensity. Optionally, the threshold is a percentage of a value derived from the intensity, e.g. half-height such as 5% of the half height of the absorption intensity. Optionally or alternatively, the threshold is based on a change in absorption intensity in response to an impedance change, for example, 20% of the intensity change. Optionally, the percentage threshold is 0.5% or 1% or 5% or 10% or 20% or any intermediate value thereof, relative to the reference magnitude (e.g. maximal absorption). Optionally or alternatively, the threshold is a predefined value, optionally the values are predefined according absorption intensity ranges such that for large intensities the value is larger relative to that of smaller intensities.

Absorption Determination Outline

In exemplary embodiments of the invention, the frequency dependent absorption efficiencies are obtained by (a) irradiating RF energy at a particular frequency into a resonant cavity, optionally through one feed at a time, (b) measuring the reflected energy and/or phase, and (c) determining a relation between the reflected energy and the irradiated energy and the phase relation at the particular frequency. The operation is repeatedly done for a few frequencies in some band until the band is covered with some frequency step. Optionally, the relation comprises ratio of the reflected energy to the input energy, while taking the phases into account we get a complex value (Input Return Loss, $S_{11}$) or a derivation thereof. The full s-parameters are mathematically converted to the impedance value frequency dependent function.

In exemplary embodiments of the invention, the absorption intensity is determined by the energy received by one or more antennas. Optionally, the absorption intensity takes into account factors such as energy losses due to currents induced in the cavity walls or coupling between a plurality of antennas. Optionally, some or all of such loss factors are ignored. Optionally or alternatively, some such loss factors are estimated or measured, optionally based on measurements without an object. Optionally or alternatively, some such loss factors are derived, at least approximately, from simulations.

In exemplary embodiments of the invention, in order to determine an absorption intensity a plurality of measurements is performed and some statistic of the measurement results is selected such as mean or median, optionally attributing different weights to different measurements.

In exemplary embodiments of the invention, the intensity absorption is determined, at least partially, according to U.S. Provisional Patent Applications No. 60/935,788 filed Aug. 30, 2007, the disclosure of which is incorporated herein by reference. This application discloses an RF heater with several exemplary types of feeds and methods for applying an RF energy to the load.

Absorption Intensities Curve

Figure 2A:
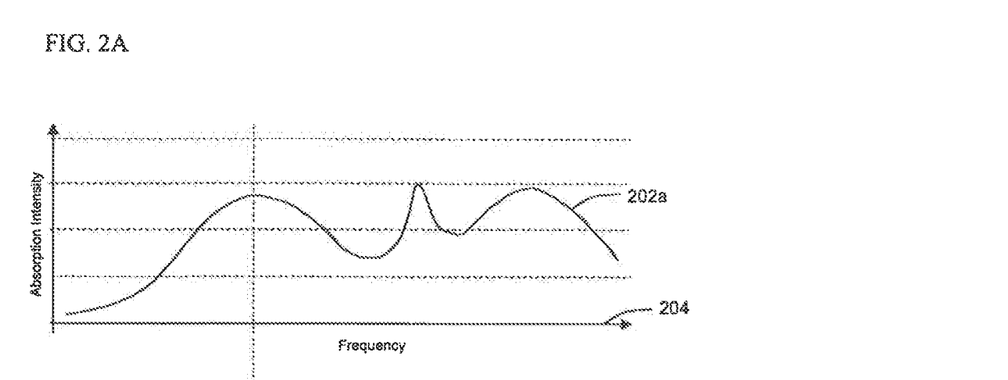
FIG. 2A schematically illustrates absorption intensities as a function of frequency before impedance matching, in accordance with an exemplary embodiment of the invention.

FIG. 2A schematically illustrates absorption intensities 202a as a function of frequency 204 before impedance matching, in accordance with an exemplary embodiment of the invention. Curve 102a represents the absorption intensities prior to impedance matching or after a change during the course of heating and before the impedance was matched for that particular case. Curve 102a is constructed according to frequency bands, wherein the bands are optionally overlap partially. Optionally, curve 102a is connected and/or smoothed to form a continuous curve.

Figure 2B:
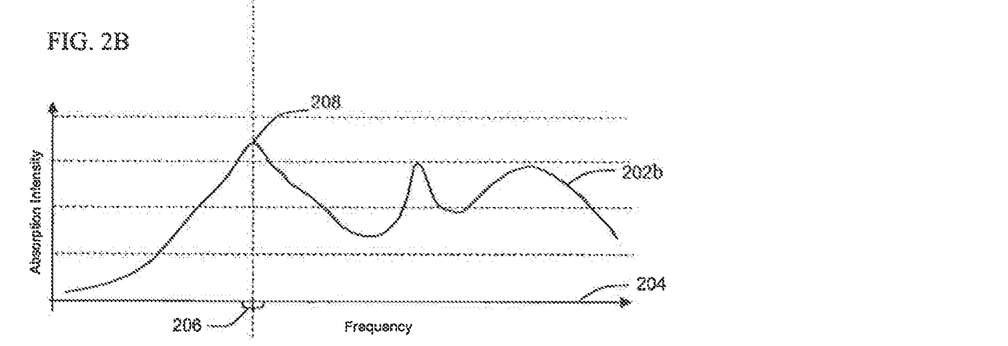
FIG. 2B schematically illustrates absorption intensities as a function of frequency after impedance matching for a particular band, in accordance with an exemplary embodiment of the invention.

FIG. 2B schematically illustrates absorption intensities 202b as a function of frequency 204 after impedance matching for a particular band 206, in accordance with an exemplary embodiment of the invention. Impedance was matched at a band about frequency region 206 such that the absorption intensity 208 corresponding to frequency region 206 is enlarged and/or maximized.

Figure 2C:
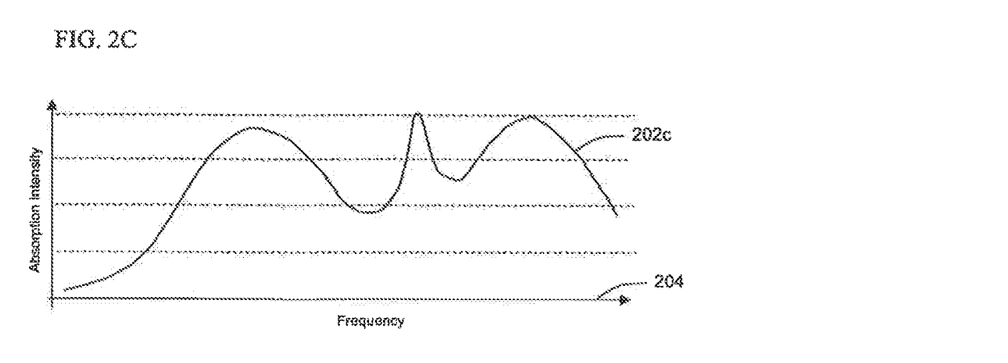
FIG. 2C schematically illustrates absorption intensities as a function of frequency after impedance matching, in accordance with an exemplary embodiment of the invention.

FIG. 2C schematically illustrates absorption intensities 202c as a function of frequency 204 after impedance matching, in accordance with an exemplary embodiment of the invention. Curve 202c is higher (larger absorption) than curve 202a since impedance was matched for all (or most) frequency bands, illustrating how the impedance matching enabled better absorption of the radiation, and hence, better heating efficiency.

Impedance Variation Overview

In exemplary embodiments of the invention, the system impedance comprises the cavity impedance and/or the feed impedance.

In exemplary embodiments of the invention, the feed impedance is set and/or varied by a circuitry installed in the feed path between the electrical energy source (e.g., RF amplifier) and a feed to the cavity, optionally transmitting antenna. Optionally, the impedance circuitry is installed as the last stage before the antenna.

Figure 3A:
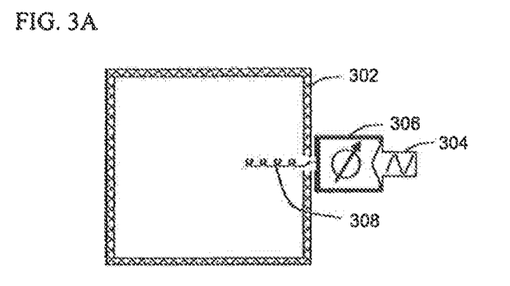
FIG. 3A schematically illustrates an impedance circuitry in a feed path, in accordance with an exemplary embodiment of the invention.

FIG. 3A schematically illustrates an impedance matching circuitry 306 in a feed path, in accordance with an exemplary embodiment of the invention. RF radiation 304 is fed into circuitry 306 and radiates into cavity 302 by antenna 308.

In exemplary embodiments of the invention, the impedance circuitry comprises a RC or RL or LC or RLC circuitry, or a combination thereof. Optionally, the impedance circuitry comprises transformers to change the impedance and/or baluns (BALanced UNblanced transformer) to change from balanced to unbalanced antenna driving and/or vice versa.

In exemplary embodiments of the invention, the impedance circuitry comprises a variable capacitor and/or a variable inductor. In exemplary embodiments of the invention, the variable capacitor comprises interleaving plates wherein the capacitance is varied by changing the overlap area of the plates. In exemplary embodiments of the invention, the inductor is a coil and the induction is varied by varying the conducting length of the coil such as a moving a contact like a rheostat. Optionally or alternatively, the induction is varied by varying the magnetic permeability of the inductor by moving an element such as a ferrite (or other materials) inside or by the inductor. Optionally, varying the impedance comprises varying the resistance of elements in the impedance circuitry such as variable resistors. In exemplary embodiments of the invention, varying the capacitance and/or induction and/or resistance results in variation of the impedance of the feed.

In exemplary embodiments of the invention, a feed impedance may be varied by changing the shape and/or size of a transmitting antenna. For example, changing the radius and/or length of a helix antenna. The change may effected by using element that expand/shrink the radius or elongate/squeeze the length, optionally using non-metallic material to avoid or minimize parasitic effects from the elements.

Figure 3B:
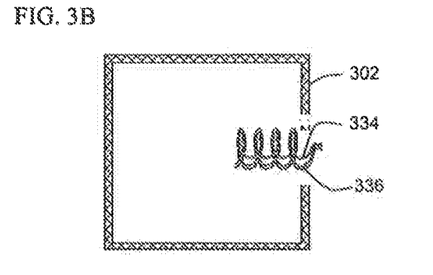
FIG. 3B schematically illustrates changing the radius of a helix antenna in a cavity, in accordance with an exemplary embodiment of the invention.

3B schematically illustrates changing the radius of a helix antenna 334 in a cavity 302, in accordance with an exemplary embodiment of the invention. Antenna 334 with expanded radius is illustrate in helix 336.

In exemplary embodiments of the invention, the impedance of the cavity is varied by insertion and/or retracting one or more mechanical elements inwards or outwards in the cavity. Optionally, the elements are shaped like rods of constant of varying thickness. Optionally, an element comprises other shapes. Optionally, an element is a plate, optionally the element is curved.

Figure 3C:
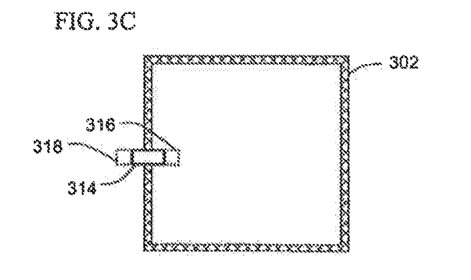
FIG. 3C schematically illustrates moving an element in and out of a cavity, in accordance with an exemplary embodiment of the invention.

FIG. 3C schematically illustrates moving an element 314 in and out of a cavity 302, in accordance with an exemplary embodiment of the invention. Ranges 316 and 318 illustrate the extent of moving element 314.

In exemplary embodiments of the invention, the impedance of the cavity is varied by moving one or more mechanical elements in the cavity. Optionally, an element shape comprises, at least partially, a plate. Optionally or alternatively, the impedance is varied by changing the shape of an element in the cavity, for example, changing the curvature of a plate.

Figure 3D:
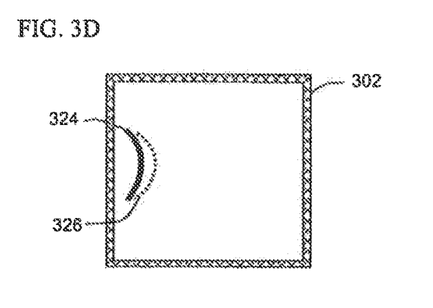
FIG. 3D schematically illustrates changing the shape of an element in a cavity, in accordance with an exemplary embodiment of the invention.

FIG. 3D schematically illustrates changing the shape of an element 324 in a cavity 302, in accordance with an exemplary embodiment of the invention. A modified curvature of element 324 is illustrated by curvature 236.

In exemplary embodiments of the invention, the impedance of the cavity is varied by switching the energy between one or more radiating elements of one or more antennas. When the antenna element is switched on, part of the electric power entering the port is delivered to the antenna element and hence converted by the antenna element to radiation. Optionally, the number and identity of active elements in the antenna change the impedance of the feed. When an antenna element is switched off it may be connected to an open termination so the element becomes a passive reflector or it may be connected to a circuitry that can affect the total system impedance.

In exemplary embodiments of the invention, the impedance of the cavity is varied by having a plurality of radiated elements in one or more antennas. The antenna elements are connected to the source through a distribution network that provides each element with a portion of the total energy and optionally with a different phase. In an exemplary embodiment of the invention, when the distribution network change its coefficients (e.g. the amplitude and/or phase of the RF signal that is directed to the elements) the system impedance is changed.

In exemplary embodiments of the invention, the drive to move the contact or element of the inductor, and/or moving the varying capacitor and/or changing resistance of resistors and/or moving elements in the cavity and/or changing shape of elements in the cavity comprises, for example, a rotary motor or a linear motor or a servo motor or a stepper motor or an actuator (e.g. a solenoid) or a ceramic motor or a combination thereof. Optionally, other mechanisms may be used, for example, a bi-metal strip (e.g. by varying the temperature with varying current).

Multiple Feeds and Multiple Sources

In exemplary embodiments of the invention, the apparatus contains multiple feeds. Each feed is capable of irradiating electromagnetic radiation in to the cavity. Optionally, each feed has its own impedance and the matching of each feed is performed independently. In an exemplary embodiment of the invention, matching a feed uses one or more trimming elements that are shared between a plurality of feeds such as cavity elements and objects and, optionally, individual-feed trimming elements and individual-feed matching circuitries. The feeds are optionally driven by a single source, switched sequentially between feeds. Additionally or alternatively, the power is distributed simultaneously between the feeds. Additionally or alternatively, the feeds are driven by a plurality of sources, optionally, each source is dedicated to a single feed.

In exemplary embodiments of the invention, the impedance matching determined by a plurality of s-parameters. The s-parameters are determined by measuring the received or reflected energy from all feeds during irradiation from each one of the feeds. Optimizing the impedance matching, in this case, involved not only minimizing the backwards reflected energy to the transmitting feed, but also minimizing the energy received by the other feeds in the system.

Apparatus Overview

In exemplary embodiments of the invention, the impedance matching is carried out by a system comprising an RF generator (synthesizer), an RF amplifier to provide the power and at least one antenna. Optionally, an antenna, or part thereof, is used for both radiation and reception of the reflected energy. Optionally the path of the radiation feed comprises other elements.

In exemplary embodiments of the invention, the system comprises controller units which control and manage, for example, the construction of frequency bands, the frequency sweep, analysis of the received signals, determination of the absorption intensities, or variation of the impedance of the feed and/or cavity. In exemplary embodiments of the invention, the controller units comprise, for example, a CPU (general purpose or dedicated purpose) and/or DSP and/or ASIC, and/or gate-array, optionally augmented by internal and/or external memory. In exemplary embodiments of the invention, the units operate according to software and/or hardware (e.g. gate array connections) program or programs or a combination thereof.

In exemplary embodiments of the invention, the apparatus comprises, at least partially, components as described in U.S. Provisional Patent Applications No. 60/935,788 filed Aug. 30, 2007, the disclosure of which is incorporated herein by reference.

In exemplary embodiments of the invention, impedance of the cavity and/or the feed can be set at a repletion rate as described above. Optionally, setting or varying the impedance is slower so that it may be performed once for a few repetitions such as sweeps. Optionally, the impedance variation is predicted for the next variation. Optionally, the prediction is based on preceding variations and/or previous operations and or experiments and/or simulations.

Exemplary Operation Values

In exemplary embodiments of the invention, the radiation extent comprise a microwave or UHF range. Optionally, the radiation is centered about 2.45 GHz. Optionally, the radiation is centered about 2 GHz. Optionally, the radiation is centered about 3 GHz. Optionally, the radiation is centered above 3 GHz or below 2 GHz, for example, about 400 MHz, or about 700 MHz or about 900 MHz.

In exemplary embodiments of the invention, the radiation sweeps in a range of several hundreds MHz, for example, about 200 MHz, or 300 MHz, or 400 MHz or 600 MHz, 800 MHz, 1 GHz, or any intermediate value. Optionally, the sweep range is up to about 3 GHz. Optionally, other sweep ranges are used.

In exemplary embodiments of the invention, a frequency band comprises frequencies of about 1 MHz to a band of about 300 MHz. Optionally, a band comprises about 1 MHz or about 5 MHz or about 10 MHz or about 20 MHz or about 50 MHz or about 100 MHz or 200 MHz.

In exemplary embodiments of the invention, the radiation frequencies ranges and band widths are as described in U.S. Provisional Patent Applications No. 60/935,788 filed Aug. 30, 2007, the disclosure of which is incorporated herein by reference.

In exemplary embodiments of the invention, the impedance of the source is a resistance. Optionally, the resistance is 50Ω or about 50Ω. Optionally the source impedance is different from 50Ω, such as about 75Ω or 10Ω.

In exemplary embodiments of the invention, a typical impedance of an empty cavity is in a range of about 0Ω to about 1000Ω

In exemplary embodiments of the invention, a typical impedance of an cavity with a typical object (food) is in a range of about 0Ω to about 1000Ω.

In exemplary embodiments of the invention, a typical impedance of a feed is in a range of about 10Ω to about 500Ω.

In exemplary embodiments of the invention, the impedance variation of a cavity is in a range about 20Ω to about 300Ω. In exemplary embodiments of the invention, the impedance variation of a feed is in a range about 30Ω to about 200Ω.

In exemplary embodiments of the invention, the impedance matching achieves a match within 5Ω or within 10% of the feed and/or cavity impedance.

It should be noted that for non-resistance impedances the values above denote the amount (absolute value) or the impedance. Optionally or alternatively, the values denote the resistance (R) component of the impedance without the reactance component.

General

In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively and additionally, portions of the invention described/depicted as a single unit may reside in two or more separate physical entities which act in concert to perform the described/depicted function. Alternatively and additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. The scope of the invention is limited only by the following claims.

All publications and/or patents and/or product descriptions cited in this document are fully incorporated herein by reference to the same extent as if each had been individually incorporated herein by reference or if they were reproduced in full herein.

What is claimed is:

1. A method for improving absorption of electromagnetic energy provided by a source at a plurality of frequencies within a frequency band into a cavity via at feeds in a system comprising the cavity and the feeds and circuitry, comprising:
    (a) determining s-parameters of the cavity and the feeds for a plurality of frequencies in the frequency band;
    (b) determining an absorption intensity characteristic of an entirety of the frequency band, based on the s-parameters determined for the plurality of frequencies in the frequency band; and
    (c) improving, utilizing the circuitry, the absorption intensity characteristic of the frequency band by changing phases of RF signals directed to the feeds based on the determined s-parameters,
    wherein the determining s-parameters comprises:
    irradiating one of more frequency bands into the cavity by one or more of the at least one feed;
    measuring reflected energy by one or more of the at least one feed; and
    determining one or more relations between the reflected energy and the irradiated energy at one or more frequency bands.

2. The method according to claim 1, wherein the improving the absorption intensity characteristic comprises maximizing the absorption intensity characteristic.

3. The method according to claim 2, wherein the maximizing comprises maximizing within a threshold.

4. The method according to claim 1, wherein the improving the absorption intensity characteristic is repeated a plurality of times.

5. The method according to claim 1, wherein changing phases of the RF signals is performed responsive to a predefined change in the absorption of electromagnetic energy at one or more frequencies.

6. An electromagnetic radiation heater configured to perform the method of claim 1.

7. The method according to claim 1, wherein the plurality of frequencies comprises RF radiation frequencies in a microwave range.

8. The method according to claim 1, wherein the cavity is a resonant cavity.

9. The method according to claim 1, wherein the cavity contains a removable added object.

10. The method according to claim 9, wherein the removable added object is heated by the electromagnetic energy.

11. The method according to claim 10, wherein the removable added object comprises food.

12. The method of claim 1, wherein the absorption intensity characteristic is an average of absorption intensities across the frequency band.

13. The method of claim 1, wherein the absorption intensity characteristic is a variance of absorption intensities across the frequency band.

* * * * *

UNITED STATES PATENT AND TRADEMARK OFFICE
CERTIFICATE OF CORRECTION

PATENT NO. : 11,129,245 B2
APPLICATION NO. : 14/746974
DATED : September 21, 2021
INVENTOR(S) : Ben-Shmuel et al.

It is certified that error appears in the above-identified patent and that said Letters Patent is hereby corrected as shown below:

On the Title Page

Item (56)/U.S. Patent Doc., page 2, Column 2, Line 56, please change "2003/0063414" to -- 2003/0068414 --
Item (56)/U.S. Patent Doc., page 2, Column 2, Line 63, please change "2005/0030373" to -- 2005/0080373 --
Item (56)/U.S. Patent Doc., page 2, Column 2, Line 78, please change "2007/0215603" to -- 2007/0215608 --
Item (56)/Foreign Doc., page 3, Column 1, Line 49, please change "ES 0615763" to -- EP 0615763 --
Item (56)/Foreign Doc., page 3, Column 1, Line 66, please change "WO 0268379" to -- EPO 0268379 --
Item (56)/Other Pubs., page 4, Column 1, Line 29, please change "Oprical" to -- Optical --
Item (56)/Other Pubs., page 4, Column 2, Line 30, please change "U.S. Appl." to -- U.S. Patent and Trademark Office Re: Appl. --
Item (56)/Other Pubs., Please add "International Preliminary Report on Patentability dated 29 May 2008 From the International Preliminary Examining Authority Re: Application No. PCT/IL2007/000236."

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*